United States Patent [19]

Feast et al.

[11] Patent Number: 5,084,539
[45] Date of Patent: Jan. 28, 1992

[54] UNSATURATED POLYMERS OF HETEROCYCLIC OLEFINS

[75] Inventors: William J. Feast, Durham; David B. Harrison, both of Durham; Alan F. Gerrard, Altrincham; Donald R. Randell, Stockport, all of England

[73] Assignee: Ciba-Geigy Corporation, Ardsley, N.Y.

[21] Appl. No.: 572,730

[22] Filed: Aug. 23, 1990

[30] Foreign Application Priority Data

Sep. 2, 1989 [GB] United Kingdom ............... 8919877

[51] Int. Cl.$^5$ ............... C08F 134/02; C08F 2/38; C08F 4/00
[52] U.S. Cl. ............... 526/268; 526/90; 526/82; 526/91; 526/270
[58] Field of Search ............... 526/268, 270, 266

[56] References Cited

U.S. PATENT DOCUMENTS

| | | | |
|---|---|---|---|
| 4,412,044 | 10/1983 | Takahashi et al. | 525/329.5 |
| 4,680,154 | 7/1987 | Matsubara et al. | 264/63 |
| 4,883,851 | 11/1989 | Grubbs et al. | 526/268 |
| 4,945,135 | 7/1990 | Grubbs et al. | 525/338 |
| 4,980,238 | 12/1990 | Ohmae et al. | 428/514 |

FOREIGN PATENT DOCUMENTS

| | | |
|---|---|---|
| 263425 | 4/1988 | European Pat. Off. |
| 1131160 | 10/1968 | United Kingdom |
| 1212266 | 11/1970 | United Kingdom |
| 1485437 | 9/1977 | United Kingdom |
| 1487185 | 9/1977 | United Kingdom |

OTHER PUBLICATIONS

B. M. Novak and R. H. Grubbs, "The Ring Opening Metathesis Polymerization of 7-Oxabicyclo-[2.2.1]hept-5-ene Derivatives: A New Acyclic Polymeric Ionophore", J. Am. Chem. Soc. 110, 960-961, 1988.
B. M. Novak and R. H. Grubbs, "Catalytic Organometallic Chemistry in Water: The Aqueous Ring-Opening Metathesis Polymerization of 7-Oxanorbornene Derivatives", J. Am. Chem. Soc. 110, 7543-7544, 1988.
Abstract of JP 62-257925.
Novack et al., Polym. Mater. Sce. Eng., vol. 57, pp. 651–655 (1987).

Primary Examiner—Joseph L. Schofer
Assistant Examiner—Wu C. Cheng
Attorney, Agent, or Firm—JoAnn Villamizar

[57] ABSTRACT

Polymers having repeating units of the general formula I

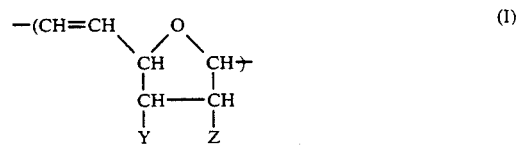

where Y and Z are the same or different and each denote —H, —COOR$^1$ or —CON(R$^2$)R$^3$, with the proviso that Y and Z do not both denote —H, or Y and Z together with the carbon atoms to which they are attached denote a divalent cyclic group of formula

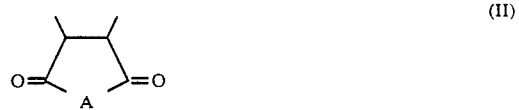

A denotes —O— or —N(R$^4$)—, R$^1$ denotes —H, C$_1$–C$_4$ alkyl or C$_2$–C$_4$ hydroxyalkyl, R$^2$ and R$^3$ each denote —H, C$_1$–C$_4$ alkyl or C$_1$–C$_4$ hydroxyalkyl, and R$^4$ denotes —H, —OH, C$_1$–C$_4$ alkyl, C$_1$–C$_4$ hydroxyalkyl or C$_1$–C$_4$ alkoxy. The carboxyl-containing polymers are useful in water treatment.

17 Claims, No Drawings

UNSATURATED POLYMERS OF HETEROCYCLIC OLEFINS

The present invention relates to novel unsaturated polymers useful, inter alia, as additives for water treatment and as precursors for such additives.

Preparation of unsaturated polymers by ring opening metathesis polymerisation is well known. Classical examples include the polymerisation of cyclic olefins such as cyclopentene and norbornene as well as substituted norbornenes. Although molecular weight has been regulated in some of the above examples, polymers produced are generally of high molecular weight.

Traditionally, metathesis polymerisation is performed with transition metal catalysts that require the exclusion of water and oxygen from the systems. Recently however GRUBBS [JACS 1988, Vol. 110, 960–961 and JACS 1988, Vol. 110, 7542-7543] described the polymerisation of substituted cyclic olefins using ruthenium catalysts in aqueous systems. Moreover the use of water appears to accelerate the polymerisation and decrease the initiation period as compared to organic solvents. Typically polymers prepared have a weight average molecular weight ($M_W$) of greater than 100,000 polystyrene equivalents. Metathesis polymerisation has been performed in the presence of chain transfer agents to give lower molecular weight polymers, as described by Novak and Grubbs in Polym. Mater. Sci. Eng. 1987, 57, 651–5.

We have found that polymerisation of selected functionally substituted cylic olefins by metathesis optionally in an aqueous environment gives polymers containing carboxyl groups which can be used as additives for water treatment, and precursors for such carboxyl-containing polymers.

Accordingly the present invention provides a polymer having repeating units of the general formula I

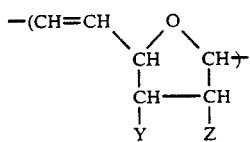

(I)

where Y and Z are the same or different and each denote —H, —COOR$^1$ or —CON(R$^2$)R$^3$, with the proviso that Y and Z do not both denote —H, or Y and Z together with the carbon atoms to which they are attached denote a divalent cyclic group of formula

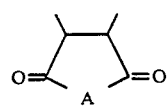

(II)

A denotes —O— or —N(R$^4$)—, R$^1$ denotes —H, C$_1$-C$_4$alkyl or C$_2$-C$_4$hydroxyalkyl, R$^2$ and R$^3$ each denote —H, C$_1$-C$_4$alkyl or C$_1$-C$_4$hydroxyalkyl, and R$^4$ denotes —H, —OH, C$_1$-C$_4$alkyl, C$_1$-C$_4$hydroxyalkyl or C$_1$-C$_4$alkoxy.

When at least one of Y and Z denotes —COOR$^1$, R$^1$ may denote a methyl, ethyl, propyl, butyl, hydroxyethyl, hydroxypropyl or hydroxybutyl group. Preferably, R$^1$ denotes a hydrogen atom or a methyl group, especially a hydrogen atom.

In embodiments where at least one of Y and Z denotes —CON(R$^2$)R$^3$, R$^2$ and R$^3$ may be the same or different and may each denote a hydrogen atom, or a methyl, ethyl, propyl, butyl, hydroxymethyl, hydroxyethyl, hydroxypropyl or hydroxybutyl group.

When A in formula II denotes —N(R$^4$) and R$^4$ denotes an alkyl, hydroxyalkyl or alkoxy group, each having 1 to 4 carbon atoms, R$^4$ may denote a methyl, ethyl, propyl, butyl, hydroxymethyl, hydroxyethyl, hydroxypropyl, hydroxybutyl, methoxy, ethoxy, propoxy or butoxy group.

In especially preferred polymers of the invention, Y and Z are the same and each denote —COOH or —COOCH$_3$, most preferably —COOH.

The polymers of the invention generally have a weight average molecular weight $M_W$ of 500 to 1,000,000, for example 500 to 150,000, preferably 500 to 20,000, especially 500 to 10,000. The double bonds in the polymers may be in the trans or cis configuration.

The polymers of formula I may be prepared by ring opening metathesis polymerisation of an olefin monomer of the general formula III

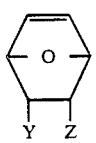

(III)

where Y and Z are as defined above, in an aqueous or organic solvent or diluent in the presence, as catalyst, of a salt or complex of a metal of group VIII of the Periodic Table. For the preparation of polymers having a $M_W$ up to 20,000, polymerisation is preferably effected in the presence of a chain transfer agent.

The groups Y and Z in the monomer of formula III may be in the exo or endo configuration, but preferably they are in the exo configuration. Monomers of formula III where one of Y and Z is —H and the other is —COOH, where Y and Z each denote —COOH, or where Y and Z together denote a group of formula II where A is —O— may be prepared by a conventional Diels-Alder reaction of furan with acrylic acid, maleic acid or maleic anhydride respectively. Those monomers can be reacted with an alcohol R$^1$OH, an amine HN(R$^2$)R$^3$ or an amine R$^4$NH$_2$ as appropriate using conventional procedures to give the other monomers of formula III. The monomer of formula III where Y and Z each denote —COOH may also be prepared by hydrolysis of the furan-maleic anhydride reaction product (see R. B. Woodward and H. J. Boer, J. Am. Chem. Soc. 70, 1161 (1948).

The chain transfer agent is generally a substance having acyclic carbon-carbon unsaturation, preferably one or more olefinic double bonds. It may contain one or more hydroxy, ether, carboxyl, ester, amide or imide groups. When polymerisation is effected in an aqueous medium the chain transfer agent is preferably miscible with water. Suitable chain transfer agents include those of formula

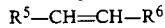

(IV)

where R$^5$ and R$^6$ are the same or different and each denote —H, C$_1$-C$_4$alkyl, phenyl, halophenyl, —CH$_2$OR$^1$, —COOR$^1$ or —CON(R$^2$)R$^3$, with the proviso that $R^5$ and $R^6$ are not both —H, where $R^1$, $R^2$ and $R^3$ are as hereinbefore defined.

Preferred chain transfer agents include those of formula IV where one of $R^5$ and $R^6$ denotes —CH$_2$OH, —CH$_2$OCH$_3$, —COOH or —COOH or —COOCH$_3$ and the other denotes —H, —CH$_2$OH, —CH$_2$OCH$_3$, —COOH or —COOCH$_3$. Compounds of formula IV where $R^5$ and $R^6$ are the same and denote —CH$_2$OH or where $R^5$ denotes —H and $R^6$ denotes —COOH are particularly preferred.

The amount of chain transfer agent which is used depends on the desired molecular weight for the polymer being prepared, an increase in the molar ratio of chain transfer agent to monomer of formula II resulting in a decrease in molecular weight of the polymer. In general, the molar ratio of chain transfer agent to monomer may be from 1:100 to 15:1, preferably from 1:100 to 10:1, particularly from 1:30 to 10:1.

Where reference is made herein to polymers, monomers and chain transfer agents containing carboxyl groups, these may be present as free acid groups or in ionised form, i.e. as salts of the acids with metals, preferably alkali and alkaline earth metals, ammonia or organic amines.

The catalyst may be a salt or complex of iron, cobalt, nickel, ruthenium, rhodium, palladium, osmium, iridium or platinum. The salt may be of an organic acid such as p-toluenesulphonic acid or an inorganic acid such as hydrochloric, sulphuric or nitric acid. The most suitable catalyst for use with a particular monomer or particular reaction conditions may readily be determined by routine experimentation. In general, ruthenium and osmium salts and complexes are preferred, particularly where the monomer contains a —COOH group or where the polymerisation is effected in an aqueous medium. Preferred catalysts include halides, particularly chlorides, or ruthenium, osmium and iridium.

Examples of specific especially preferred catalysts are ruthenium III chloride and osmium III chloride.

The amount of catalyst used is not particularly critical provided that an effective amount is used. Suitable amounts are from 1% to 20% by weight based on the weight of monomer, preferably 5 to 15% by weight. The solution of the catalyst may be re-used in a subsequent reaction.

The reaction may be carried out in an aqueous or organic solvent or diluent, for example, water, ethanol, toluene, chlorobenzene or mixtures of two or more thereof. Water and chlorobenzene-water mixtures are preferred. When water is used an emulsifying agent may also be present if desired.

The polymerisation reaction may be carried out at room temperature or at elevated temperature e.g. from 25° C. to 100° C., preferably from 40° C. to 80° C. The most suitable temperature for use with a particular catalyst may readily be determined by routine experimentation. The reaction proceeds at atmospheric pressure.

The resulting polymer has repeating units of the general formula I above, which are end-stopped by a group derived from the chain transfer agent and/or a group derived from the monomer, e.g. —CH$_2$OH or —COOH groups.

Once prepared the polymers of the invention may be converted into other polymers of the invention, for instance ester groups may be converted into acid groups and vice versa.

The polymers of the invention have a range of uses. All of the polymers are useful as intermediates for functional polymers. Water-soluble or water-dispersible polymers of the invention are particularly useful. For example, the polymers containing carboxyl groups are useful as additives for water treatment, e.g. for scale control, dispersancy etc. Accordingly, the invention also provides an aqueous composition containing from 0.1 to 50,000 parts per million by weight of a polymer of the invention. The invention further provides a method of treating an aqueous liquid which comprises adding to the liquid a polymer of the invention in an amount of 0.1 to 50,000 ppm by weight. When the polymer is used as an additive for water treatment such as scale control, dispersancy etc, the aqueous composition preferably contains from 0.1 to 100 ppm, especially 0.5 to 20 ppm, by weight of the polymer. The aqueous liquid treated with a polymer of the invention may be, for example, water in cooling systems, steam generating systems, sea-water evaporators, bottle washing plants, sugar evaporators, gas scrubbing systems, heating systems and refrigeration systems.

The invention is illustrated by the following Examples, in which parts and percentages are by weight unless stated otherwise.

EXAMPLE 1

A mixture of 3.0 parts cis-but-2-ene-1,4-diol and 1.0 part exo-cis-2,3-bis(carbomethoxy)-7-oxabicyclo[2.2.1-]hept-5-ene is prepared and stirred with a magnetic stirring bar at a temperature of 55° C. To this mixture a solution of 0.067 parts ruthenium III chloride trihydrate in 3.0 parts water is added. The reaction mixture is stirred for 24 hours at 55° C. to produce a viscous brown tar as polymeric product. The product is purified by partitioning between water and dichloromethane, drying the dichloromethane fraction over magnesium sulphate and adding the dried fraction to diethylether to precipitate the polymer. This yields 0.6 part of a viscous brown polymer having repeating units of formula I where X denotes —O—, and Y and Z each denote —COOCH$_3$.

GPC analysis in THF reveals $M_n=780$; $M_w=970$; dispersity 1.26, with respect to polystyrene standards. Proton NMR analysis reveals 50% trans vinylene units.

EXAMPLE 2

A mixture of 1.5 parts cis-but-2-ene-1,4-diol, 3.0 parts chlorobenzene and 1.0 pat exo cis-2,3-bis(carbomethoxy)-7-oxabicyclo[2.2.1]hept-5-ene is prepared and stirred at 55° C. To this mixture a solution of 0.06 part by weight ruthenium III chloride trihydrate in 3.0 parts water is added. The reaction mixture is stirred for 24 hours at 55° C. to produce a viscous brown tar as polymeric product. The product is purified by extraction into dichloromethane, followed by precipitation into diethylether to yield 0.25 part of a viscous brown polymer having repeating units of formula I where X denotes —O—, and Y and Z each denote —COOCH$_3$.

GPC analysis in THF reveals $M_n=1400$; $M_w=3400$; dispersity 2.35, with respect to polystyrene standards. Proton NMR analysis reveals 50% trans vinylene units.

EXAMPLE 3

A mixture of 2.0 parts cis-but-2-ene-1,4-diol, 1.0 part water and 1.0 part 7-oxabicyclo[2.2.1]hept-5-ene-exo-cis-2,3-dicarboxylic acid is prepared and stirred at 55° C. To this mixture a solution of 0.07 part ruthenium III chloride trihydrate in 3.5 parts water is added. The reaction mixture is stirred for 24 hours at 55° C. to produce a viscous brown product. The product is purified by dissolving in aqueous 20% sodium hydroxide and reprecipitation by acification with concentrated sulphuric acid to give 0.2 parts of a viscous white oil as polymer product, having repeating units of formula I where Y and Z each denote —COOH.

GPC analysis in water reveals $M_n=800$; $M_w=1200$; dispersity 1.5, with respect to polystyrene standards. Proton NMR analysis reveals 62% trans vinylene units.

EXAMPLE 4

A mixture of 1.0 part exo-cis-2,3-bis(carbomethoxy)-7-oxabicyclo[2.2.1]hept-5-ene and 3 parts water is prepared and stirred at a temperature of 55° C. To this mixture is added a solution of 0.06 part ruthenium III chloride trihydrate in 3 parts water. The reaction mixture is stirred for 24 hours at 55° C. to produce 0.6 part of a white polymeric solid. The product is purified by dissolving in dichloromethane and re-precipitating into diethylether to yield 0.6 part of a white polymer having repeating units of formula I where Y and Z each denote —COOCH$_3$.

GPC analysis in THF reveals $M_n=68,000$; $M_w=124,000$; dispersity 1.83, relative to polystyrene standards. Proton NMR analysis reveals 50% trans vinylene units.

EXAMPLE 5

A mixture of 4.0 parts of 7-oxabicyclo[2.2.1]hept-5-ene-exo-cis-2,3-dicarboxylic acid and 12 parts cis-but-2-ene-1,4-diol is prepared and stirred at a temperature of 55° C. To this mixture is added a solution of 0.28 parts ruthenium III chloride trihydrate in 14 parts water. The reaction mixture is stirred for 24 hours at 55° C. to produce 3.5 parts of a viscous oil as polymeric product. The product is purified by dissolving in aqueous 20% sodium hydroxide, followed by filtration and precipitation into methanol. The product has repeating units of formula I where Y and Z each denote —COOH. GPC analysis gives $M_n=1,900$; $M_w=4,500$.

EXAMPLE 6

A mixture of 4.0 parts of 7-oxabicyclo[2.2.1]hept-5-ene-exo-cis-2,3-dicarboxylic acid and 3 parts cis-but-2-ene-1,4-diol is prepared and stirred at 55° C. To this mixture is added a solution of 0.28 parts osmium III chloride trihydrate in 14 parts water. The reaction mixture is stirred for 48 hours at 55° C. to produce 3.0 parts of polymeric product. The product is purified by dissolving in aqueous 20% sodium hydroxide followed by filtration and precipitation into methanol.

The product has repeating units of formula I where Y and Z each denote —COOH. GPC analysis gives $M_n=2,600$; $M_w=4,100$.

EXAMPLE 7

1.0 part of 7-oxabicyclo[2.2.1]hept-5-ene-exo-cis-2,3-dicarboxylic acid is heated to 55° C. To this is added a solution of 0.07 parts ruthenium III chloride trihydrate in 7.5 parts water. The reaction mixture is stirred for 48 hours at 55° C. to produce 0.95 parts of polymeric product. The product is purified by dissolving in aqueous 20% sodium hydroxide followed by filtration and precipitation into methanol.

The product has repeating units of formula I where Y and Z each denote —COOH. GPC analysis gives $M_w$ greater than 100,000.

EXAMPLE 8

A mixture of 1.0 part of 7-oxabicyclo[2.2.1]hept-5-ene-exo-cis-2,3-dicarboxylic acid and 0.2 parts of acrylic acid is prepared and stirred at 55° C. To this mixture is added a solution of 0.08 parts ruthenium III chloride trihydrate in 4.0 parts of water. The reaction mixture is stirred for 48 hours at 55° C. to produce 0.35 parts of polymeric product. The product is purified by dissolving in aqueous 20% sodium hydroxide followed by filtration and precipitation into methanol.

The product has repeating units of formula I where Y and Z each denote —COOH. GPC analysis gives $M_n=6,000$; $M_w=27,000$.

EXAMPLE 9

A mixture of 4.0 parts of 7-oxabicyclo[2.2.1]hept-5-ene-exo-cis-2,3-dicarboxylic acid and 1.0 part of maleic acid is prepared and stirred at 55° C. To this mixture is added a solution of 0.24 parts ruthenium III chloride trihydrate in 12 parts of water. The reaction mixture is stirred for 48 hours at 55° C. to produce 0.65 parts of polymeric product. The product is purified by dissolving in aqueous 20% sodium hydroxide followed by filtration and precipitation into methanol.

The product has repeating units of formula I where Y and Z each denote —COOH. GPC analysis gives $M_w$ greater than 100,000.

EXAMPLE 10

The product of Example 5 is tested for ability to inhibit the precipitation of calcium carbonate by the following test.

| Calcium carbonate (cooling water) threshold test | |
|---|---|
| Test Conditions | |
| Test temperature | 70° C. |
| Test duration | 30 minutes |
| Aeration rate | 500 cc/min (per 100 ml) |
| Calcium | 150 ppm as $Ca^{2+}$ |
| Magnesium | 45 ppm as $Mg^{2+}$ |
| Carbonate | 51 ppm as $CO_3^{2-}$ |
| Bicarbonate | 269 ppm as —$HCO_3$ |
| Test additive | 2 ppm |

The test is designed to assess the ability of an additive to inhibit the precipitation of $CaCO_3$. The water composition simulates cooling water and the high temperature represents the conditions which exist close to a heat exchanger. Air bubbling is used to increase the severity of the test conditions.

A volume of solution containing sodium carbonate and sodium bicarbonate is mixed with an equal volume of a solution containing calcium chloride and magnesium chloride which already contains the test additive. The resulting test solution, through which air is bubbled at a constant rate, is stored at 70° C. for 30 minutes. After this time, the solution is filtered and the calcium remaining in the filtrate is determined by EDTA titration.

Each test is carried out in duplicate, and the first test is a standard test which determines the actual $Ca^{2+}$ concentration in the test.

$$\% \ CaCO_3 \ \text{inhibition} = \frac{\text{titre of test-titre of blank}}{\text{titre of standard-titre of blank}} \times 100$$

The standard and blank titres are usually 15–16 ml and 5–6 ml, respectively.

The product of Example 5, at 2 ppm level of addition, gave a % CaCO$_3$ inhibition of 79.

We claim:

1. A polymer having a M$_w$ of 500 to 10,000 of the formula

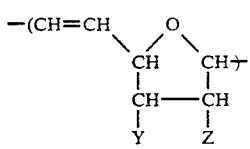

where Y and Z are the same or different and each denote —H, —COOR$^1$ or —CON(R$^2$)R$^3$, with the proviso that Y and Z do not both denote —H, or Y and Z together with the carbon atoms to which they are attached denote a divalent cyclic group of formula

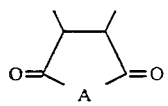

wherein A denotes —O— or —N(R$^4$)—, R$^1$ denotes —H, C$_1$–C$_4$alkyl or C$_2$–C$_4$hydroxyalkyl, R$^2$ and R$^3$ each denote —H, C$_1$–C$_4$alkyl or C$_1$–C$_4$hydroxyalkyl, and R$^4$ denotes —H, —OH, C$_1$–C$_4$alkyl, C$_1$–C$_4$hydroxyalkyl or C$_1$–C$_4$alkoxy.

2. A polymer according to claim 1, in which at least one of Y and Z denotes —COOR$^1$ and R$^1$ denotes a hydrogen atom or group.

3. A polymer according to claim 1, in which Y and Z are the same and each denote —COOH or —COOCH$_3$.

4. A process for the preparation of a polymer according to claim 1, which comprises ring opening metathesis polymerization of an olefin monomer of the formula III

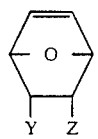

where Y and Z are defined in claim 1, in an aqueous or organic solvent or diluent in the presence, as catalyst, of a salt or complex of a metal of Group VIII of the Periodic Table and in the presence of a chain transfer agent of the formula IV $$R^5—CH=CH—R^6 \quad (IV)$$

where R$^5$ and R$^6$ are the same or different and each denote —H, C$_1$–C$_4$alkyl, phenyl, halophenyl, —CH$_2$OR$^1$, —COOR$^1$ or —CON(R$^2$)R$^3$, with the proviso that R$^5$ and R$^6$ are not both —H, where R$^1$, R$^2$ and R$^3$ are as defined in claim 1.

5. A process according to claim 4, in which R$^5$ and R$^6$ are the same and denote —CH$_2$OH or —COOH or in which R$^5$ denotes —H and R$^6$ denotes —COOH.

6. A process according to claim 4, in which the molar ratio of chain transfer agent to monomer is from 1:100 to 10:1.

7. A process according to claim 4, in which the catalyst is a salt or complex of ruthenium or osmium.

8. A process according to claim 7, in which the catalyst is a halide of ruthenium or osmium.

9. A process according to claim 8, in which the catalyst is ruthenium III chloride or osmium III chloride.

10. A process according to claim 4, which is carried out in water or a chlorobenzene-water mixture.

11. A process according to claim 4, which is carried out at a temperature of 40° to 80° C.

12. An aqueous composition containing from 0.1 to 50,000 ppm by weight of a polymer according to claim 1.

13. A composition according to claim 12, which contains from 0.1 to 100 ppm by weight of the polymer.

14. A method of treating an aqueous liquid which comprises adding to the liquid from 0.1 to 50,000 ppm by weight of a polymer according to claim 1.

15. A method according to claim 14, wherein said polymer contains carboxyl groups and is added as a scale control additive.

16. A method according to claim 15, wherein said polymer is added in an amount of 0.1 to 100 ppm by weight.

17. A method according to claim 15, wherein said polymer is added in an amount of 0.5 to 20 ppm by weight.

* * * * *